US012397541B2

(12) United States Patent
Dicke

(10) Patent No.: US 12,397,541 B2
(45) Date of Patent: Aug. 26, 2025

(54) METHOD AND DEVICE FOR PROCESSING AN OBJECT

(71) Applicant: SWISS KRONO Tec AG, Lucerne (CH)

(72) Inventor: Sebastian Dicke, Bantikow (DE)

(73) Assignee: SWISS KRONO Tec AG, Lucerne (CH)

(*) Notice: Subject to any disclaimer, the term of this patent is extended or adjusted under 35 U.S.C. 154(b) by 0 days.

(21) Appl. No.: 18/255,001

(22) PCT Filed: Dec. 1, 2021

(86) PCT No.: PCT/EP2021/083792
§ 371 (c)(1),
(2) Date: May 30, 2023

(87) PCT Pub. No.: WO2022/117657
PCT Pub. Date: Jun. 9, 2022

(65) Prior Publication Data

US 2024/0009993 A1 Jan. 11, 2024

(30) Foreign Application Priority Data

Dec. 3, 2020 (EP) .................................... 20211512

(51) Int. Cl.
*B41F 33/00* (2006.01)
*B41J 3/01* (2006.01)
(Continued)

(52) U.S. Cl.
CPC ............. *B41F 33/0036* (2013.01); *B41J 3/01* (2013.01); *B44C 5/04* (2013.01); *D21H 21/48* (2013.01)

(58) Field of Classification Search
CPC .......... B41F 33/0036; B41J 3/01; B44C 5/04; D21H 21/48; B21H 21/48
See application file for complete search history.

(56) References Cited

U.S. PATENT DOCUMENTS 6,465,046 B1 10/2002 Hansson et al.
9,914,323 B2 3/2018 Garsse et al.
(Continued)

FOREIGN PATENT DOCUMENTS

CN 101331022 A 12/2008
CN 105102234 A 11/2015
(Continued)

OTHER PUBLICATIONS

International Search Report issued on Mar. 28, 2022 in corresponding Application No. PCT/EP2021/083792, 19 pages.
(Continued)

*Primary Examiner* — David H Banh
(74) *Attorney, Agent, or Firm* — Andrew M. Calderon; Calderon Safran & Wright P.C.

(57) ABSTRACT

The disclosure relates to a method for processing an object, in which a printed image is printed onto the object by a digital printing facility and the object is then further processed in at least one work station. The at least one work station being controlled by an electric control unit, where at least one control character is applied to the object by the digital printing facility, the control character being detected in or upstream of the work station by at least one sensor and transmitted to the electric control unit, which controls the at least one work station depending on the control character transmitted.

18 Claims, 1 Drawing Sheet

(51) Int. Cl.
*B44C 5/04* (2006.01)
*D21H 21/48* (2006.01)

(56) References Cited

U.S. PATENT DOCUMENTS

| | | | | |
|---|---|---|---|---|
| 2009/0066987 | A1* | 3/2009 | Inokuchi | G03G 21/046 358/1.13 |
| 2009/0226232 | A1 | 9/2009 | Schölzig | |
| 2013/0295352 | A1 | 11/2013 | Thiers et al. | |
| 2014/0209685 | A1* | 7/2014 | Venkatesha | G06K 7/1443 235/462.07 |
| 2016/0023453 | A1 | 1/2016 | Lehnhoff | |
| 2017/0008303 | A1 | 1/2017 | Loebel | |
| 2017/0309104 | A1* | 10/2017 | Lewis | G07D 7/0043 |
| 2019/0016081 | A1* | 1/2019 | Widner | B31B 50/16 |
| 2019/0018629 | A1* | 1/2019 | Seay | G06F 3/1204 |
| 2019/0217601 | A1 | 7/2019 | Streichardt | |
| 2021/0224248 | A1* | 7/2021 | Gu | G16H 10/60 |
| 2022/0126563 | A1* | 4/2022 | Schwab | B41F 27/06 |

FOREIGN PATENT DOCUMENTS

| | | | |
|---|---|---|---|
| CN | 105873769 | A | 8/2016 |
| CN | 107209963 | A | 9/2017 |
| CN | 110267813 | A | 9/2019 |
| CN | 110730714 | A | 1/2020 |
| CN | 110770766 | A | 2/2020 |
| CN | 110893725 | A | 3/2020 |
| CN | 111094008 | A | 5/2020 |
| DE | 60015603 | | 2/2006 |
| DE | 102009051637 | | 5/2011 |
| DE | 102014100858 | | 7/2015 |
| DE | 102016109361 | | 11/2017 |
| EP | 1785276 | | 5/2007 |
| EP | 2960064 | | 12/2015 |
| EP | 3075906 | | 10/2016 |
| WO | 2019052953 | | 3/2019 |

OTHER PUBLICATIONS

China Office Action and Search Report dated Jun. 28, 2025 in CN Application No. 202180081239.4 with English Translation, 16 pages.

* cited by examiner

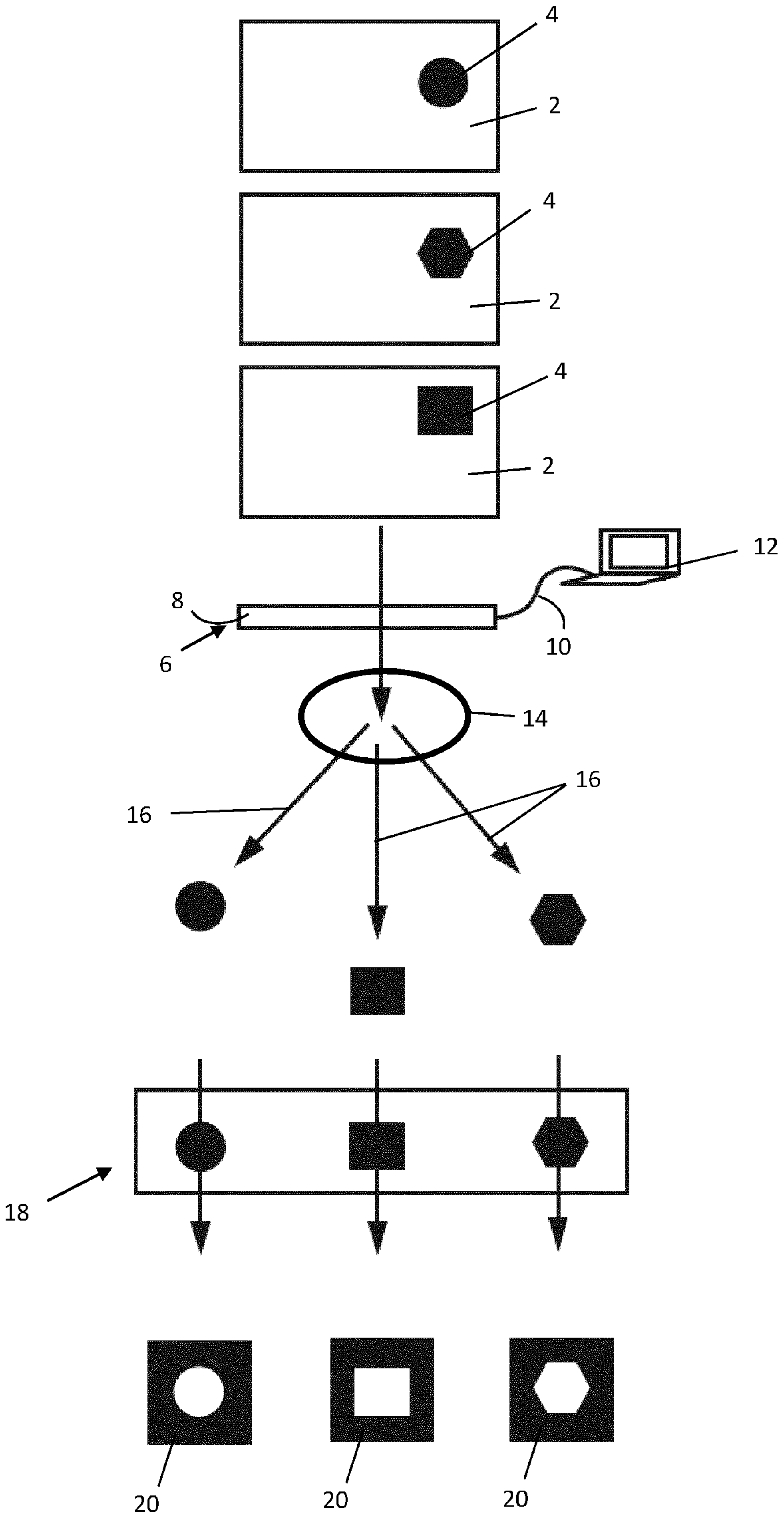
4
2
4
2
4
2
12
8
6
10
14
16
16
18
20
20
20

METHOD AND DEVICE FOR PROCESSING AN OBJECT

FIELD OF INVENTION

The invention relates to a method for processing an object, in which a printed image is printed onto the object by means of a digital printing facility and the object is then further processed in at least one work station, the at least one work station being controlled by means of at least one electric control unit. The invention also relates to a device for conducting such a method.

BACKGROUND OF INVENTION

Nowadays, printed images are printed onto a range of objects for various purposes. For example, a decorative pattern is printed onto the surface of paper web in a range of applications and for many different purposes. In the present case, a decorative pattern is understood in particular to mean a graphic, particularly preferably a pictorial, representation which should change the visual impression made by the paper. The paper web is in the form of a roll and is unrolled or unwound from the roll for printing. Preferably, it is cut to the right size, which depends on the application, after printing. This can, but does not have to, happen immediately after printing. It is also possible to roll it onto another paper roll after the paper web has been printed and add it to a subsequent process step.

The use of a digital printing facility for printing the surface of the object has a number of advantages. For example, it is very quick and easy to switch from one decorative pattern to another. There is no need to remove or exchange any rollers or similar elements, meaning that conversion times are very short.

Printed objects, such as paper webs, are further processed in at least one subsequent work station, depending on the application. The work station is preferably a device or facility that is controlled by means of an electric control unit, in particular a control program that runs in an electronic data processing device. Various control parameters are required and used to control the device or facility that constitutes the work station or forms part of the work station.

SUMMARY OF INVENTION

The invention aims to further develop the method in such a way that the production process of the further processing is improved and rendered more efficient.

The invention solves the addressed task by way of a method according to the preamble of claim 1, characterized in that at least one control character is applied to the object by means of the digital printing facility, said control character being detected in or upstream of the work station by means of at least one sensor and transmitted to the electric control unit, which controls at least one work station depending on the control character transmitted.

With the method according to the invention, it is therefore no longer necessary to separately transfer information on how the process step should be carried out in the at least one further work station to the electric control unit, which controls the work station. Rather, the printed object, for example a printed paper web, is used as a carrier of data and information. This ensures that the control characters for the respective printed paper web are transferred to the electric control unit. An accidentally incorrect control of the at least one further work station is ruled out as long as the correct control character is applied to the paper web.

Preferably, as many control characters as necessary are applied to the object to control the subsequent work station. Depending on the type and device of the work station, this may refer to different numbers and types of control characters. In a preferred embodiment, the printed object is further processed in multiple work stations, wherein control characters are preferably applied to the object for each of the subsequent work stations, which are to be controlled and operated depending on certain parameters of the object. Such parameters may be, for example, the length, the width, the density, the thickness or the printed image, but also the intended use, a bundle size, delivery period and delivery location or other parameters.

The method according to the invention allows input parameters of the object, the applied printed image and/or the purpose of product or interim product produced with the object to be amended, and in doing so only amending the printed image and/or the control characters applied. In particular, it is preferably not necessary to make any separate changes to the settings, such as the working parameters, of the work station in which the printed object is further processed. Such changes, which are or may be necessary, can be transmitted via the amended control characters to the electric control unit of the subsequent work station, which controls the work station in a correspondingly amended manner. In the process, various production parameters can be realized and changes made quickly and easily.

The printed image preferably contains a decorative pattern which should change the visual impression of the printed object, for example a paper web. Alternatively or additionally, the printed image contains at least one photo that is to be printed with the method and subsequently further processed. Packaging printing processes, in which a packaging is printed, can also be designed as methods according the invention. The packaging is then the object to printed and processed, and the printed image contains, for example, a decorative pattern and/or information on the object later contained in the packaging.

Advantageously, the at least one control character is printed simultaneously with the printed image, preferably in the printed image. Particularly preferably, the digital printing facility is used for this purpose, which is also used to print the printed image. The at least one control character can be applied to a part of object onto which the printed image is not printed, for example the edge. Alternatively or additionally, at least one control character is applied in the printed image, i.e., to the part of the object that is covered by the printed image. Preferably, the at least one control character is designed in such a way that it is imperceptible to the human eye. In this case, a special ink and/or a special pigment can be used, for example, that only becomes visible in UV light or IR light. The at least one control character is, however, preferably applied with an ink that is, in principle, visible to the human eye. However, the control character is arranged in the decorative pattern in such a way that the human eye does not recognize it and it thus has no disruptive effect on the decorative pattern. This is known, for example, from copy protection technology or digital watermarks. Here, signals such as characters/codes are placed, for example by means of software, in the individual color separations in the printed image in such a way that they are not visible to the human eye, but can be read using optical measurement technology and special software. For example, the company Filigrade (www.filigrade.com) has developed an app which enables users to read a "watermark" or other information by means of a cellphone camera and software in the app. It is thus possible, for example, to read information from a packaging or a decorative pattern that is not perceptible to the human eye.

Preferably, the at least one sensor is an optical sensor, in particular a camera, such as an infrared or UV camera. An infrared camera is a camera that is able to detect infrared radiation. A UV camera, on the other hand, is able to detect ultra-violet radiation. Preferably, the optical sensor is able to detect light that is visible to humans.

Advantageously, the section of the object that is detected by the at least one sensor is irradiated with electromagnetic radiation, for example infrared or ultra-violet radiation. Optical sensors are able to detect electromagnetic radiation that is emitted or reflected by the printed object, i.e., by a printed paper web, for example. Through irradiation with infrared radiation of a certain wavelength, for example in the infrared or ultraviolet range, it is possible to make certain pigments, dyes or other additives glow. In this context, this is referred to as fluorescence or luminescence. The source of radiation that emits the electromagnetic radiation is, for example, a lamp and preferably part of the work station.

The at least one sensor detects the at least one control character and sends sensor data to the electric control unit. Preferably, the control character is determined from the sensor data sent by the sensor, for example by image recognition software, which, particularly preferably, occurs inside the electric control unit of the work station. The work station has an electronic data processing device, in particular a microprocessor or computer, that is capable of running electronic data processing programs. This allows the electric control unit to process the sensor data and detect the control characters contained therein that are detected by the sensor. The control characters contain information, for example coded information, that is processed by the electric control unit and contains information on working parameters of the respective work station. The electric control unit is configured to take this information on working parameters from the control characters and to control the work station in accordance with these working parameters.

In a preferred embodiment, at least one work station is an impregnation station, in which the object is at least partially impregnated with a material. This is especially beneficial in the case of printed paper webs which, for example, are to be applied to a carrier material, particularly a wood-based material panel. The at least one control character preferably contains information on a position of the control character on the object and/or a composition and/or an amount of the material used for the impregnation. An impregnation station is used, for example, to impregnate the entire object after the decorative pattern has been printed onto it. As a result, the object, such as a paper web, is rendered, for example, waterproof or at least water-resistant and the printed image, in particular a decorative pattern, is protected. In this state, the impregnated object is used, for example, to be applied to a carrier, such as a wood-based material panel. Where applicable, the object, in particular a paper web, is divided, for instance cut, into suitably sized pieces. In an alternative embodiment, the impregnation station is used to only impregnate part of the printed object. In this case, the material used for impregnation can also be designed in such a way that it is only applied to one side of the object. This may refer to a thermoplastic, which is preferably applied in liquid or at least malleable form.

In a particularly preferred embodiment example, this is done on the last few meters of a paper web that has been printed with the digital printing facility, so that when the paper web is wound onto a roll, a few turns, for example 3, 5 or 7 turns, have been subjected to and/or impregnated with the material. When the material cures, this produces a packaging that is preferably waterproof and which can be printed on or labelled, for example. To this end, it is beneficial if the final meters of the paper web can be identified by the impregnation station. In this case, it is therefore advantageous if the at least one control character contains information about its own position on the paper web. For example, it may contain information that indicates that the control character is arranged 100 m, preferably 50 m, in particular preferably 20 m, before the end of the paper web. The sensor recognizes this control character, transmits the sensor data to the electric control unit and this identifies when and, in particular, that the impregnation station is to apply the material that is to be applied for the purposes of impregnation or coating.

Preferably, the printed paper web or another printed object is applied to a carrier that is divided into multiple elements, in particular panels. The carrier preferably features a wood-based material panel to which the printed object is applied, where applicable after impregnation. The carrier is generally not provided in the form of an endless roll or web, but, particularly in the case of wood-based material panels, is in the form of large panels to which correspondingly sized pieces of the paper web are applied. In a cutting station, the printed object is cut into layers, so-called sheets, of the desired size. The size preferably corresponds to the size of the wood-based material panels to which the layers are to be applied. Preferably, the at least one control character contains information on how large the wood-based material panels are, so that the electric control unit recognizes from the at least one control character how the cutting station has to be controlled and operated in order to generate layers of the paper web of the desired size.

The wood-based material panels are divided into multiple elements. This preferably occurs after the cut layers of the printed object have been applied, for example glued or laminated. Preferably, the at least one control character contains information on how large, in particular how long and how wide, the individual elements are, so that a separating station can be correspondingly controlled by its electric control unit, to which the information from the control character has been transmitted.

In a preferred embodiment, bundles are assembled in which a plurality of the elements produced in this manner are packaged. This is advantageous, for example, in the case of panels that can be used as floor, wall and/or ceiling covering. It is often the case that elements with different decorative patterns are desired, for example to avoid repetitions of the decorative pattern in a covering made up of several of these elements. This is particularly advantageous when a real wood covering is to be imitated, as repetitions of the decorative pattern do not naturally occur. Preferably, the composition of the bundles depends on the at least one control character. The different decorative patterns exhibited by the individual elements are usually applied to the object together in a single print cycle by means of the digital printing facility, the object preferably being a paper web in this embodiment example. The individual decorative patterns are only separated when the object and/or the carrier is cut and separated. For example, the at least one control character contains a number or a marking of the individual decorative pattern, so that a packing station, which assembles the individual bundles, can, on the basis of the control characters, identify and control which elements are to be combined in one bundle and, where applicable, packaged together.

Alternatively or additionally, at least one control character is applied after the printed image has been printed. It preferably contains information on the quality of the printed image, in particular of a decorative pattern. This quality can be determined, for example, after the printed image has been printed by comparing the printed image, particularly an applied decorative pattern, with a target decorative pattern. A sorting station can then be controlled with an electric control unit in such a way that it sorts depending on the applied control characters and, for example, sorts first choice and second choice elements and waste, and forwards them to different work stations.

The invention also solves the addressed task by way of a device for carrying out one of the methods described here.

The working width of digital printing equipment is preferably at least 1300 mm, preferably at least 1600 mm, particularly preferably at least 2000 mm and at most 2300 mm, preferably at most 2200 mm and particularly preferably at most 2100 mm. The speed of the equipment at which the surface to be printed is moved through the equipment is preferably at least 80 m/min, preferably at least 100 m/min and particularly preferably at least 130 m/min and at most 270 m/min, preferably at most 200 m/min and particularly preferably at most 140 m/min when printing on paper. When printing onto heavier objects, for example wood-based material panels, the speed is preferably at least 60 m/min, preferably at least 70 m/min and particularly preferably at least 80 m/min and at most 110 m/min, preferably at most 100 m/min and particularly preferably at most 90 m/min.

If a primer is applied to the surface to be printed on, the applied quantity is preferably at least 1 $g/m^2$, preferably at least 2 $g/m^2$ and in particular preferably at least 3 $g/m^2$ and at most 10 $g/m^2$, preferably at most 6 $g/m^2$, in particular preferably at most 4 $g/m^2$.

In the first embodiment example, a wood decor is produced on a paper digital printing facility. The wood decor has the repeat pattern dimensions of 1400 mm length and the width 2070 mm. In the production facility, a sensor detected the remaining meters on the roll at 100 m, 50 m and 10 m. Control characters of different colors were placed at these positions: A first character in blue at 100 m, a second character in yellow at 50 m, a third character in red at 10 m. The roll is inserted for further processing into the roller bearer of an impregnation channel, which constitutes the subsequent work station. Via the at least one sensor, sensor data is sent to the electric control unit, which is able to identify and assess the colors of the control characters. For example, in the case of the 100 m control character, an acoustic signal is emitted; with the 50 m control character the automatic roller bearer is controlled and checked to determine whether, for example, a subsequent roll is available. In the case of the red control character/10 m until the end of the roll, the roll is changed automatically. This means that the paper is automatically cut off and glued to the "new" roll without interrupting production. This results in a roll with just a few residual meters on the core, without interrupting production.

In a second embodiment example, a wood decor is produced on a paper digital printing facility. The wood decor has the repeat pattern dimensions of 1400 mm length and the width 2070 mm. In the production facility, a decorative pattern is produced which comprises a total of 60 different planks, spread across three print files. In order to find this variety in the later packaging as well, control characters in the form of markings are already set in the print files in order to be able to assign the planks and the print files individually. For example, each plank receives a number which, by means of software, is embedded into the separations in such a way that it is invisible to the human eye, but which can be detected by optical measurement devices and a corresponding image recognition software. This is known, for example, from Filigrade or the field of copy protection for decorative patterns. Following floor production and profiling, when packing the planks, each packaging unit may contain different planks. The number of planks can also be printed onto the packaging in order to offer the user as great a variety as possible.

In a third embodiment example, wood decor is produced on a paper digital printing facility with a working width of 2070 mm at a speed of 135 m/min. The wood decor has the repeat pattern dimensions of 1400 mm length and the width 2070 mm. The printing facility is equipped with the ALMS (ipac) inline monitoring system. The individual repeat patterns are each evaluated with a similarity index in percent (%) and a marking (percentage) is made in the edge area in a further small digital printing unit.

In the further processing, for example during pressing in a short-cycle press, the percentages are read and evaluated with a sensor and the corresponding recognition software of the electric control unit. This information is used for an automatic sorting station. For example, the percentages 85-90%, 90-95%, 95-100% are stacked up separately from one another.

The narrow quality grades can be shipped separately from each other.

In a fourth embodiment example, a wood decor is produced on a paper digital printing facility. The wood decor has the repeat pattern dimensions of 1400 mm length and the width 2070 mm. The printing facility is equipped with a monitoring system which monitors and saves the web width/printing lengths of the individual repeat patterns. The individual values are printed in the edge area in a further small digital printing unit.

During further processing, for example in an impregnation station, the percentages are read and evaluated with a measurement device. This information is forwarded to the control unit of the impregnation channel. The formula can thus automatically be optimally adjusted to the parameters of the material to be impregnated.

BRIEF DESCRIPTION OF DRAWINGS

In the following, an embodiment example of the invention will be explained in more detail with the aid of the accompanying drawing. The FIGURE shows:

FIG. 1 is a schematic sequence of a method according to an embodiment example of the present invention.

DETAILED DESCRIPTION

From top to bottom, FIG. 1 schematically depicts the sequence of a method according to a first embodiment example of the present invention. Different control characters 4, which are schematically depicted by various geometric figures and objects, are printed onto three objects 2. This occurs in a digital printing facility, which is not depicted. The objects 2 printed in this way pass through a detection station 6 with at least one sensor 8, which is configured to detect at least the part of the objects 2 where the control characters 4 are printed. Preferably, however, the sensor 8 is configured to detect the entire printed surface of the object 2. The sensor 8 transmits the sensor data via a data line 10 to an electric control unit 12, which is depicted as an electronic data processing device. Even though the data line 10 is shown as a cable, it does not mean that this is a necessary embodiment. Of course, wireless communication between the sensor 8 and the electric control unit 12 is possible and, possibly, advantageous.

The electric control unit 12 evaluates the sensor signals transmitted by the sensor 8 via the data line 10. This occurs, for example, via an image recognition software that is able to extract, identify and evaluate the control characters 4 from the rest of the printed image not shown in FIG. 1. The information contained therein is processed in a sorting station 14, which is only schematically depicted as an oval, and ensures that, in the example embodiment shown, the further production paths 16 of the objects 2 printed with different control characters 4 separate. They are fed to different processing stations 18, which are schematically labelled in FIG. 1 with the respective control character. This results in three different productions 20, which are also labelled by the respective control character, this time as an inverse depiction.

The invention claimed is:

1. A method for processing a paper web into a wood-based panel, in which a printed image is printed onto the paper web by a digital printing facility and the paper web is then further processed in at least one work station, the at least one work station being controlled by an electric control unit, wherein at least one control character is applied to the paper web by the digital printing facility, said control character being detected by at least one sensor and transmitted to the electric control unit, a first workstation being upstream of a second work station and the second work station being upstream of a third work station and each of the first work station, the second work station and the third work station being controlled by the electric control unit depending on the control character transmitted, the first work station, the second work station and the third work station configured to provide additional processing of the paper web including a combination of an impregnation station, a cutting station, a separation station or a packing station, wherein the paper web is applied to a carrier, it is cut into multiple elements, in particular panels, and bundles with a plurality of elements are assembled and packed by the packing station, and a composition of the bundles depending on the at least one control character.

2. The method according to claim 1, wherein the at least one control character is printed simultaneously with the printed image.

3. The method according to claim 1, wherein the at least one sensor is an optical sensor.

4. The method according to claim 1, wherein a section of the paper web, which is detected by the at least one sensor, is irradiated with electromagnetic radiation.

5. The method according to claim 1, wherein the at least one work station is the impregnation station, in which the paper web is at least partially impregnated with a material, and the at least one control character contains information on a position of the control character on the paper web and/or a composition and/or amount of the material.

6. A method for processing a paper web into a wood-based panel, in which a printed image is printed onto the paper web by a digital printing facility and the paper web is then further processed in at least one work station, the at least one work station being controlled by an electric control unit, wherein at least one control character is applied to the paper web by the digital printing facility, said control character being detected by at least one sensor and transmitted to the electric control unit, a first workstation being upstream of a second work station and the second work station being upstream of a third work station and each of the first work station, the second work station and the third work station being controlled by the electric control unit depending on the control character transmitted, the first work station, the second work station and the third work station configured to provide additional processing of the paper web including a combination of an impregnation station, a cutting station, a separation station or a packing station, wherein the at least one control character is applied after the printed image is printed and contains information on the quality of the decorative pattern, and wherein the sorting station sorts the paper web depending on the control character.

7. A device for carrying out a method according to claim 1.

8. The method according to claim 3, wherein the at least one sensor is a camera.

9. The method according to claim 8, wherein the camera is an infrared camera.

10. The method according to claim 3, wherein the camera is a UV camera.

11. The method according to claim 4, wherein the electromagnetic radiation is IR radiation or UV radiation.

12. The method according to claim 4, wherein the electromagnetic radiation is UV radiation.

13. The method according to claim 1, wherein the paper web is a carrier which is divided into multiple panels by the cutting station.

14. The method of claim 1, wherein the at least one control character is printed simultaneously with the printed image.

15. The method of claim 1, wherein the at least one control character is imperceptible and becomes visible in ultraviolet light or infrared light.

16. The method of claim 1, wherein the impregnation station at least partially impregnates the printed web with a material after the printed image has been applied, the material being waterproof or at least water-resistant and the printed image is a decorative pattern which is protected by the material.

17. The method of claim 1, wherein the at least one control character contains information about its own position on the paper web.

18. A method for processing a paper web into a wood-based panel, in which a printed image is printed onto the paper web by a digital printing facility and the paper web is then further processed in at least one work station, the at least one work station being controlled by an electric control unit, wherein at least one control character is applied to the paper web by the digital printing facility, said control character being detected by at least one sensor and transmitted to the electric control unit, a first workstation being upstream of a second work station and the second work station being upstream of a third work station and each of the first work station, the second work station and the third work station being controlled by the electric control unit depending on the control character transmitted, the first work station, the second work station and the third work station configured to provide additional processing of the paper web including a combination of an impregnation station, a cutting station, a separation station or a packing station, wherein the cutting station cuts the paper web into a specified size that corresponds to a size of a carrier, prior to being applied to the carrier to form the wood-based panel, the at least one control character contains information on how large is the wood-based panel such that the electric control unit recognizes from the at least one control character how the cutting station has to be controlled and operated to generate layers of the paper web of a desired size.

* * * * *